No. 687,587. Patented Nov. 26, 1901.
H. E. & L. F. STEWART.
LAWN MOWER.
(Application filed Nov. 24, 1900.)
(No Model.) 2 Sheets—Sheet 1.
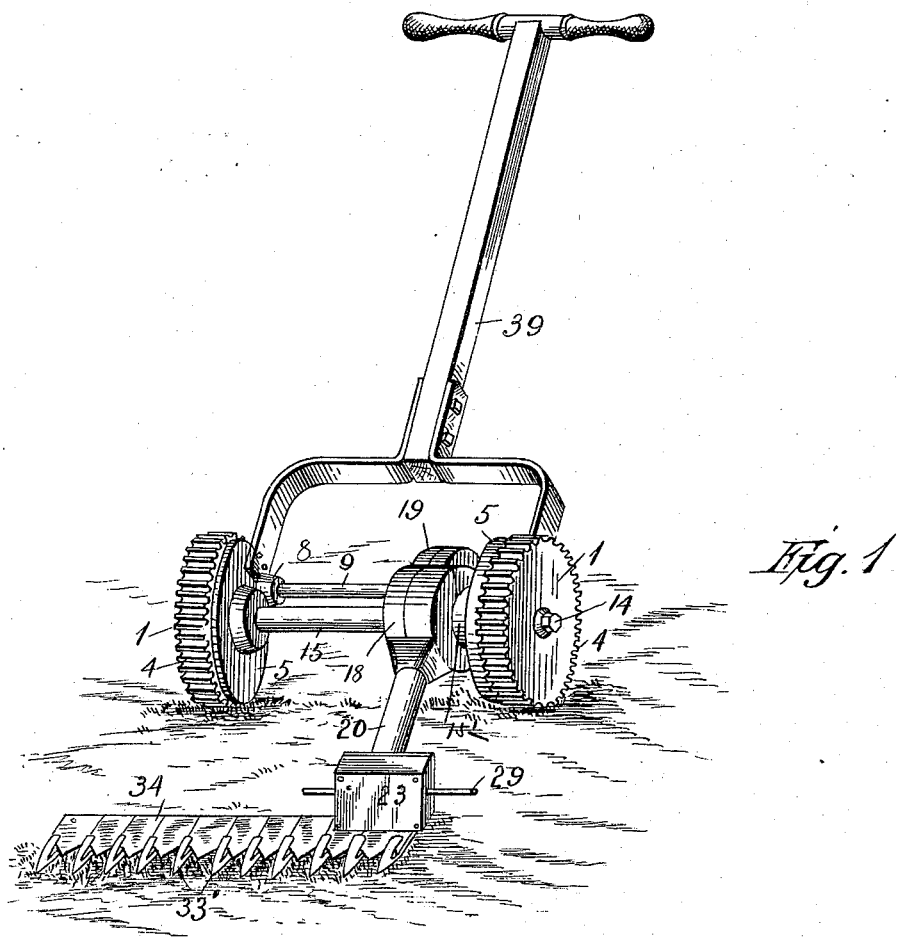
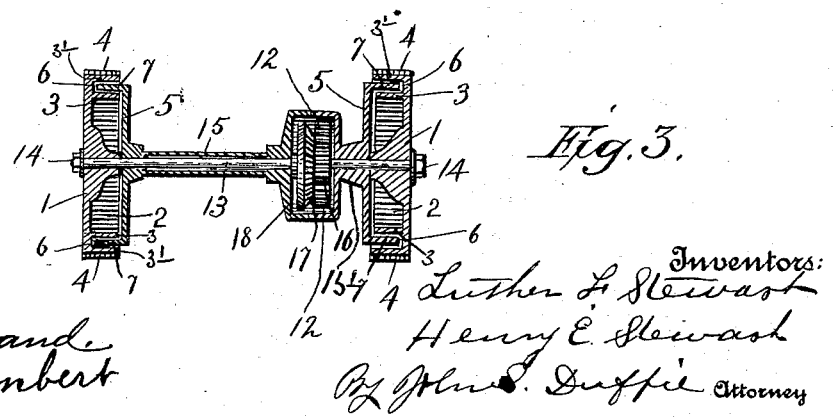

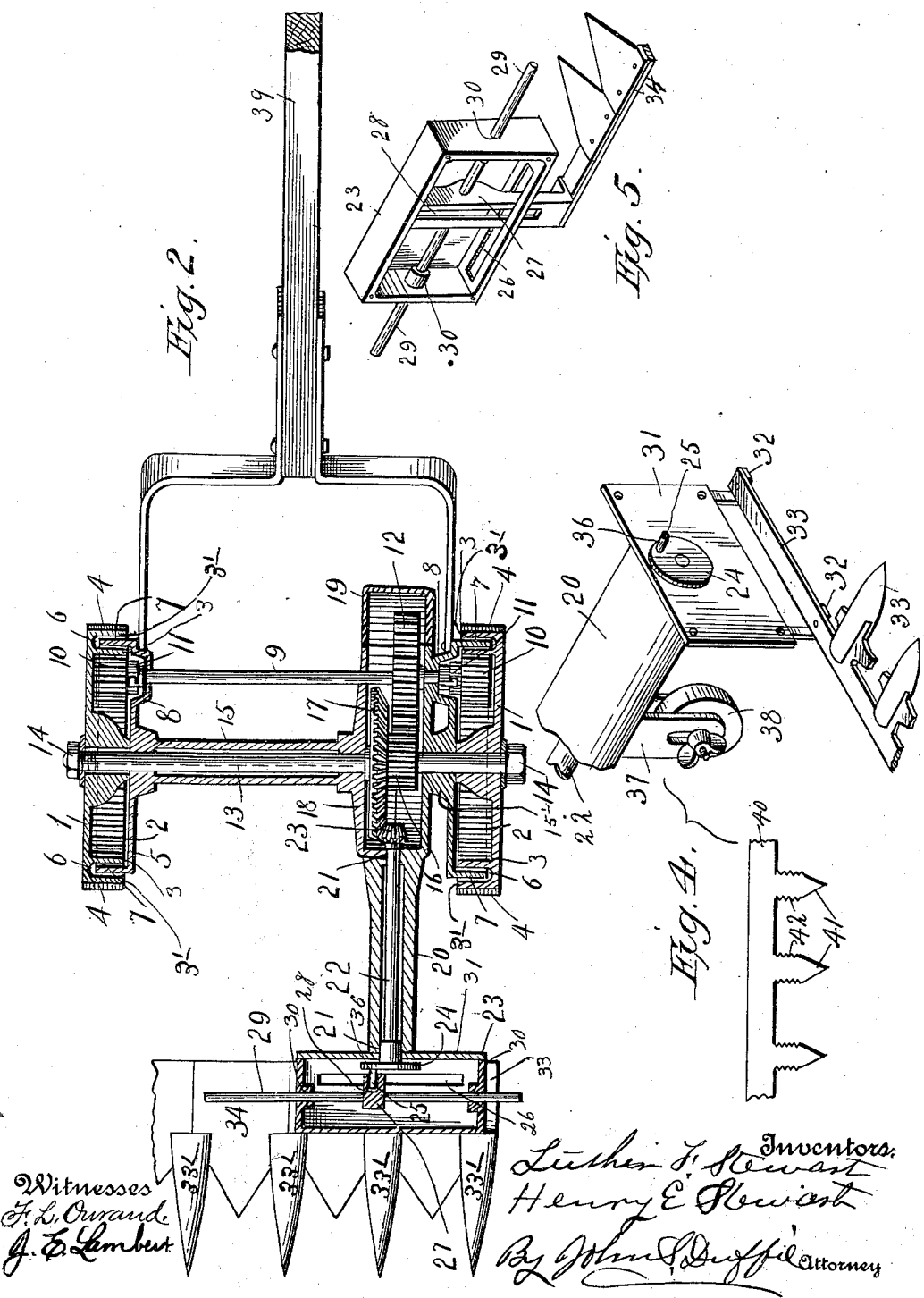

UNITED STATES PATENT OFFICE.

HENRY E. STEWART AND LUTHER F. STEWART, OF STEPHENVILLE, TEXAS.

LAWN-MOWER.

SPECIFICATION forming part of Letters Patent No. 687,587, dated November 26, 1901.

Application filed November 24, 1900. Serial No. 37,621. (No model.)

*To all whom it may concern:*

Be it known that we, HENRY E. STEWART and LUTHER F. STEWART, citizens of the United States, residing at Stephenville, in the county of Erath and State of Texas, have invented and produced a new and original Improvement in Lawn-Mowers; and we do hereby declare the following to be a full, clear, and exact description of the same, reference being had to the accompanying drawings, forming a part thereof.

Our invention is a lawn-mower; and it consists in the novel construction and arrangement of its parts.

In the accompanying drawings, Figure 1 is a perspective view of our invention. Fig. 2 is a top plan view of our invention with the driving machinery in horizontal section. Fig. 3 is a sectional view of the drive-wheels, of the pinion, bevel gear-wheel, double protection-box, axle-cover, bearings, and protection-plates. Figs. 4 and 5 are detailed views.

1 represents the drive-wheels. These drive-wheels contain cogs 2 around on the inner faces of their inner flanges 3. On the periphery of these drive-wheels are elevations 4 to sink in the ground, and thus keep the wheels from slipping on the surface of the ground. Each one of these drive-wheels is provided with flanges 3 and 3', leaving between them a groove 6. The mouths of these grooves 6 open from the inner faces of the wheels. 5 represents circular plates concentric with said drive-wheels and work against the inner faces of the same, and each is provided with a flange 7, that fits in the groove 6. The object of these plates 5, grooves 6, and flanges 7 is to protect the cogs from dirt, grass, trash, and the like. Secured to the inner faces of these circular plates and some little distance from their centers are bearings 8, and journaled in these bearings is a gear-axle 9, and journaled on each end of this axle and beyond the plates 5 are cog-wheels 10, (see Fig. 2,) which mesh with cogs 2 of the drive-wheels. On this gear-axle and working in the bearings 8 are ratchet-wheels and ratchets 11. Rigidly secured on said gear-axle and near one end is a gear-wheel 12.

Passing through the center of the drive-wheels 1 is a bearing-axle 13, said wheels being secured from working off by end nuts 14. One end of said bearing-axle is protected by a cylindrical cover 15, one end of which cover is secured to or may be integral with the inner face of one of the circular plates 5, the other end widening and forming one-half of a double box 18 19, and the other end of said bearing-axle is protected by a cylindrical cover 15', one end of which cover is secured to or may be integral with the inner face of the other circular plate 5, the other end of said cover widening and forming one-half of the double box 18 19. Revolving on said bearing-axle 13 is a small cog-wheel 16, which meshes with the cog-wheel 12, above mentioned, and rigidly secured on said gear-axle 9. Revolving on said bearing-axle 13 is also a bevel cog-wheel 17, rigidly secured to said cog-wheel 16, the said cog-wheel 12 working in box 19 and meshing with cog-wheel 16, working in the box 18. Extending from the front part of box 18 is a hollow arm 20, provided with bearings 21, and working in this hollow arm 20 and bearings 21 is a shaft 22, having on its rear end a bevel cog-wheel 23, meshing with the bevel cog-wheel 17, revolving on bearing-axle 13.

At the front end of the hollow arm 20 is a stroke-box 23. Centrally and perpendicularly secured to the forward end of the shaft 22 and working in the stroke-box 23 is a wheel 24, and to the front face of this wheel 24 is eccentrically secured a pin 25, covered by a friction-roller 36. In the bottom wall of the stroke-box 23 is a longitudinal slot 26, and working in said stroke-box is a stroke-block 27, its lower end working down through said slot, said block having in its rear face a vertical groove 28, and running through this stroke-block is a cylindrical rod 29, said stroke-block being rigidly secured to said rod. The ends of said rod run through openings in the ends of said box and work in bearings 30, secured to the ends of said box. By this arrangement said stroke-block is permitted to play back and forth in said box.

Perpendicularly and centrally secured to the front end of the hollow arm 20 is a plate 31, which may be integral with the said arm or secured thereto, said plate forming the rear wall of the stroke-box 23, and extending from the lower edge of said plate 31 are elbow-arms 32, and to these elbow-arms is secured a guard-bar 33, in which works a sickle 34, the teeth 35 of which are V-shaped. Removably secured in the guard-bar 33 is a steel blade 40, provided with teeth 41, the edges of which for part of their length having notches or corrugations 42 on their sides to catch the stiff grass and keep it from slipping as the teeth in the sickle-blade play back and forth in the guard-bar 33. This plate 40 is removable and may be removed to be sharpened or for any other purpose. One end of the sickle-blade 34 is secured to the lower end of the stroke-block 27. The guard-fingers 33' may extend in front of the stroke-box, as shown in Figs. 1 and 2, or may stop short at the end of the same, as shown in Fig. 4.

Extending from the lower face of the hollow arm 20 is a slotted arm 37, and in the bifurcated end of said slotted arm is adjustably secured a roller 38 to regulate the height of the guard-bar, and secured to the circular plates 5 is a handle 39.

The operation of this invention is too manifest to need further description.

Having described our invention, what we claim as new, and desire to secure by Letters Patent, is—

1. The combination of a bearing-axle 13; drive-wheels 1, journaled on said axle, provided with inwardly-extending flanges 3, and 3'; cogs 2, extending inwardly from the inner faces of the inner flanges; circular grooves 6, near the periphery of said drive-wheels, and beyond the cogs 2; circular plates 5, concentric with said drive-wheels, and working against the inner faces thereof, and having flanges 7, working in said grooves 6; bearings 8, secured to said circular plates, a little distance from their centers; a gear-axle 9, journaled in said bearings; cog-wheels 10, one journaled on each end of said gear-axle, and meshing with the cogs 2, of the drive-wheels; ratchets and ratchet-wheels 11, working in said bearings 8; cog-wheel 12, rigidly secured near one end of said gear-axle; cylindrical covers 15, and 15', surrounding said bearing-axle 13, their outer ends secured to said circular plates, and their inner ends enlarging into a double box 18, and 19; a pinion cog-wheel 16, revolving on said bearing-axle 13, and meshing with said cog-wheel 12; bevel gear-wheel 17, secured to said wheel 16, and also revolving on said bearing-axle, said wheels 12, 16, and 17, working in the said double box; a hollow arm 20, extending from the forward part of said box; a shaft 22, revolving in said hollow arm, and having on its rear end a bevel cog-wheel 23, meshing with bevel cog-wheel 17, on the bearing-axle; said mechanism adapted to operate a sickle-blade, substantially as shown and described and for the purposes set forth.

2. The combination of a bearing-axle; drive-wheels journaled on said axle, and provided with internally-extending flanges, leaving between them a circular groove; cogs extending inwardly from the inner faces of the inner flanges of said wheels; circular plates 5, concentric with said drive-wheels, each having a flange, working in the grooves of said drive-wheels; bearings secured to said circular plates, a little distance from their centers; a gearing-axle journaled in said bearings; ratchets and ratchet-wheels working in said bearings; a cog-wheel journaled on each end of said gearing-axle, and meshing with the cogs of the drive-wheels; a cog-wheel rigidly secured on said axle near one end; a cylindrical cover, surrounding part of the bearing-axle, and having one end secured to one of the cylindrical plates, its other end enlarging and forming one half of a double box; a cylindrical cover, covering the other part of said bearing-axle, and having one end secured to one of the circular plates, and its other end enlarging and forming the other half of the double box; a double box consisting of the two last-mentioned enlargements, and covering the central gearing-wheels; a pinion cog-wheel 16, working in said box, and revolving on the bearing-axle, and meshing with the last-mentioned wheel; a bevel gear-wheel secured to said pinion-wheel, and also working in said double box, and revolving on said bearing-axle; a hollow arm extending from the forward part of said double box; a shaft adapted to revolve in said hollow arm, and having on its rear end a bevel cog-wheel, meshing with said last-mentioned bevel cog-wheel, and having secured centrally and perpendicularly on its front end a wheel; a pin secured eccentrically in said wheel, protected by a friction-roller; a guard-bar secured to the front end of said hollow arm; a toothed and corrugated blade removably secured in said guard-bar; a sickle working in said guard-bar; said sickle adapted to be operated by the mechanism above described, substantially as shown and described and for the purposes set forth.

3. In a lawn-mower, substantially as shown and described, a hollow arm extending forwardly from the double box; a shaft revolving in said hollow arm, and having on one end a bevel cog-wheel adapted to be operated by a bevel cog-wheel of the machine; a plate centrally and perpendicularly secured to the front end of said hollow arm; elbow-arms secured to said plate; a guard-bar secured to said elbow-arms; a stroke-box secured to the front face of said plate, and having in its lower wall a horizontal slot; a rod passing horizontally through said box, and working in bearings; a stroke-block situated in said box and rigidly secured to said rod, and having in its rear face, a vertical slot, its lower end extending down through the slot in the box; a sickle-bar secured to the lower end of said stroke-block; a wheel centrally and perpendicularly secured to the front end of the said shaft, and working in said box; a pin eccentrically secured to the front face of said wheel, and working in the slot of the stroke-block, substantially as shown and described and for the purposes set forth.

In testimony whereof we affix our signatures in presence of two witnesses.

HENRY E. STEWART.
LUTHER F. STEWART.

Witnesses as to signature of Henry E. Stewart:
JOHN W. ALLEN,
F. W. SINGLETON.

Witnesses as to signature of Luther F. Stewart:
ROXIE HYATT,
LEONA HYATT.